July 27, 1965  J. P. FELBURN  3,197,228
VEHICLE FRAMES
Filed Feb. 27, 1963  3 Sheets-Sheet 1

INVENTOR.
JOHN PHIL FELBURN
BY
ATTORNEYS

July 27, 1965

J. P. FELBURN 3,197,228

VEHICLE FRAMES

Filed Feb. 27, 1963

3 Sheets-Sheet 3

INVENTOR.
JOHN PHIL FELBURN
BY
*Williams and Kreske*
ATTORNEYS

United States Patent Office 3,197,228
Patented July 27, 1965

3,197,228
VEHICLE FRAMES
John Phil Felburn, 4160 W. Broad St., Columbus, Ohio
Filed Feb. 27, 1963, Ser. No. 261,421
2 Claims. (Cl. 280—81)

My invention relates to vehicle frames, more particularly to frames for trailers for hauling freight over a roadway, and the principal object of my invention is to provide new and improved frame construction of the character described.

The frame of a vehicle must necessarily be strong and rigid to withstand the various kinds of road shock encountered during hauling operations, and this is particularly true in the case of freight hauling trailers. In many cases in the prior art, the strength and rigidity was obtained by making frame parts of heavier material and although this accomplished the purpose, it did bring about an undesirable weight factor. Since most state roads and highways have a load limit, the increased weight of the trailer frame correspondingly decreased the pay load which may be carried by the trailer. In the present highly competitive freight hauling field, a difference of a few hundred pounds of freight carried may be the difference between that of successful and profitable operations and that of failure.

Figure 1:
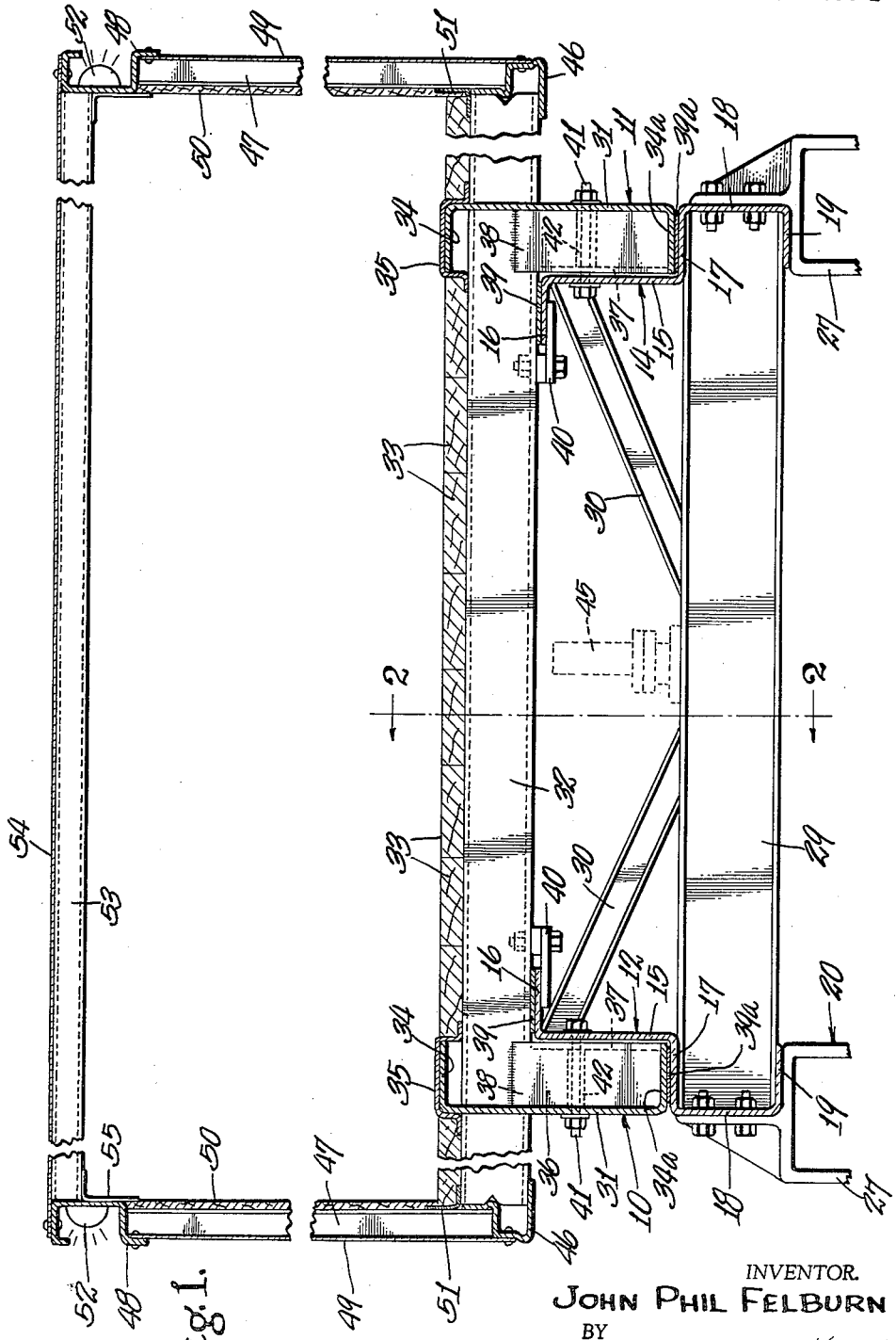
Figure 2:
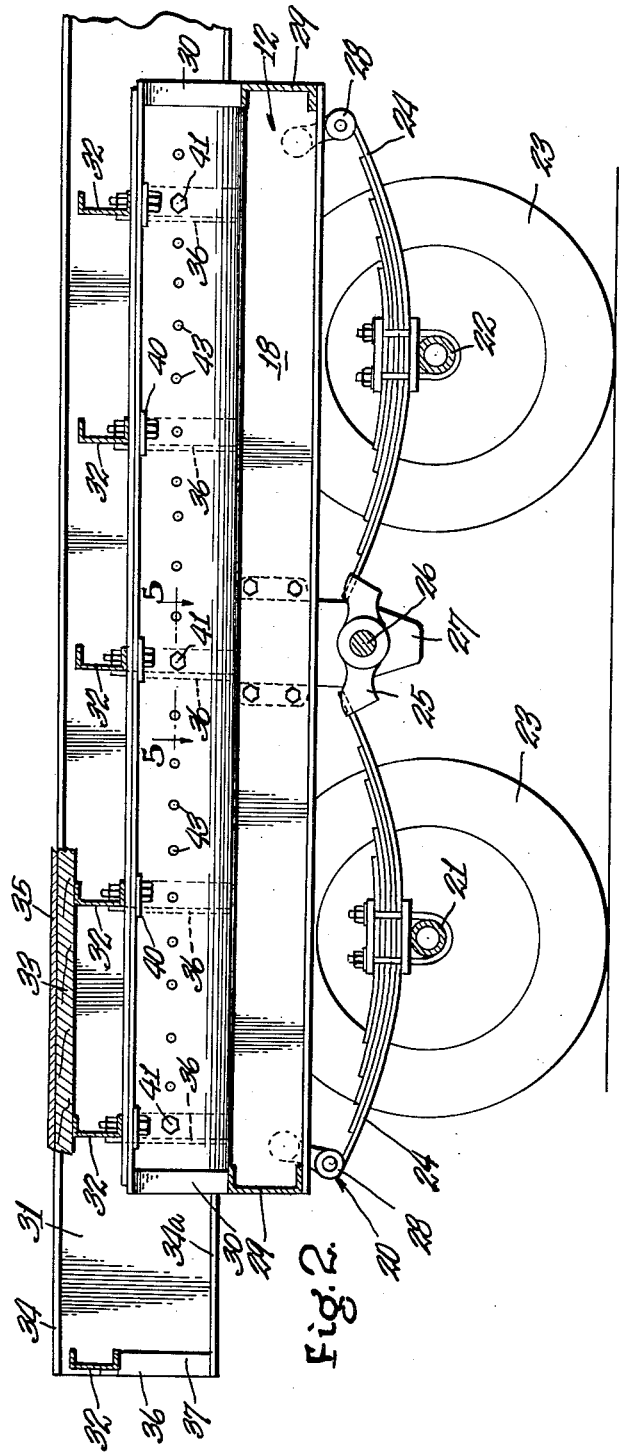
Figure 3:
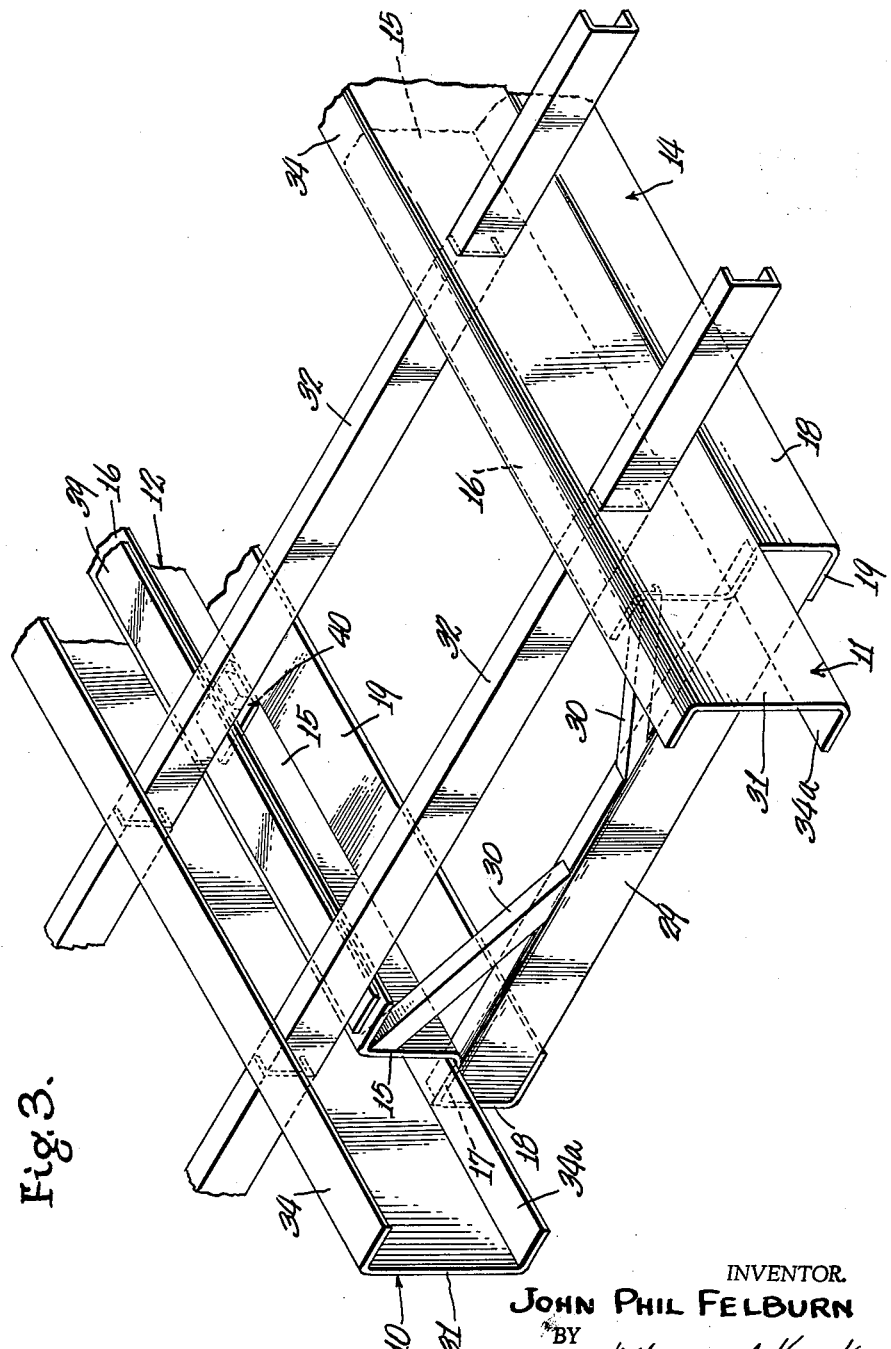

My invention provides a vehicle frame that has all of the requisites for strength and rigidity and yet is light in weight so that more pay load may be carried thereon. Other advantages will appear as the description proceeds and reference is made to the drawings wherein there is shown, for purposes of illustration, an embodiment which my invention may assume, and in these drawings:

FIGURE 1 is a fragmentary sectional view taken transversely of a freight hauling trailer at the rear portion thereof, parts being broken away and parts omitted, FIGURE 2 is a fragmentary longitudinal view corresponding generally to the line 2—2 of FIGURE 1, and drawn to a reduced scale, FIGURE 3 is a fragmentary perspective view of parts constituting the trailer frame, FIGURE 4 is a fragmentary perspective view illustrating a detail, and FIGURE 5 is a fragmentary sectional view corresponding generally to the line 5—5 of FIGURE 2.

The embodiment of the invention herein disclosed comprises a pair of channel members 10, 11 which are spaced apart laterally and which extend longitudinally of the vehicle frame in usual manner. Cooperating with the respective channel members are structural members 12, 14, which are generally of Z-section in that each has a vertically extending web 15, an upper horizontal leg 16 and a lower horizontal leg 17. In the disclosed embodiment, each member also has a vertical leg 18 extending from the leg 17, and a horizontal leg 19 extending from the leg 18. The legs 17, 18 and 19 form a box section and with the other legs and web provide considerable rigidity.

A wheel unit 20 underlies the vehicle frame and is connected to the two Z-section members 12, 14 to form a wheel bogey unit for supporting the vehicle frame from a road surface. The wheel unit may take any suitable form and, as herein shown, comprises a pair of axles 21, 22 which carry rubber-tired wheels 23 to form a stable wheel support. Leaf springs 24, or other suitable spring suspension, are connected at their midpoints to respective axles, adjoining ends of the springs having slip-shackle connection with a rocker arm 25.

It will be appreciated that four leaf springs 24 will be used, two on each axle 21, 22, and laterally spaced-apart as in usual spring construction. Accordingly, two rocker arms 25 are used, one for each set of cooperating springs, the arms being rockable about a shaft 26 which is carried by spring hanger plates 27 the latter being connected to and extend downwardly from respective Z-section members. As seen in FIGURES 1 and 2, the plates 27 are bolted to the vertical legs 18 of respective members 12, 14. The outer ends of each set of leaf springs are connected with respective members 12, 14 by means of usual spring shackles 28.

Channels 29, 29 close the open ends of the members 12, 14 and are preferably welded in place to increase rigidity. Channel-shaped brace members 30, 30 are welded between the upright leg 15 of each member 12, 14 and a central part of the channels 29 to further increase rigidity. These brace members 30 are located at the front and rear ends of the members 12, 14, as seen in FIGURE 2.

The vertical webs 15, 15 of the members 12, 14 are spaced inwardly of the vertical webs 31, 31 of respective channel members 10, 11, as best seen in FIGURE 1, to form therewith a box-like arrangement. The vertical webs 31, 31 are pierced at selected longitudinal places to pass cross-sills 32 which are preferably formed of channel section for strength purposes, and which are preferably welded to the webs 31, 31 at their intersection.

As best seen in FIGURES 1 and 3, the cross-sills 32 project between the channel members 10, 11 and their ends extend beyond the outer side of each member, the upper legs of the cross-sills providing support for the floor of the trailer bed. The floor may be in the form of planks 33 which are laid lengthwise of the vehicle and thus cross-wise of the cross-sills 32. The upper leg 34 of each channel section 10, 11 is substantially flush with the floor, as seen in FIGURE 2, and a hat section 35 encompasses and is secured to each upper leg 34 to provide strength and to also provide a suitable anchor for the adjoining flooring planks.

To further strengthen the channel members 10, 11, plates 36 are welded at one side edge to the interior surface of the vertical web 31 and at a top edge to the web of a cross-sill 32. As seen in FIGURE 2, a plate 36 is provided at the place where each cross-sill 32 intersects the vertical web 31 of the channel members 10, 11 and thus it will be appreciated that a great amount of rigidity will be imparted to such channel members. Each plate 36 has an angular extension 37 which is parallel to and lies along the upright vertical web 15 of a respective Z-section member 12, 14 to steady such vertical web and yet permit slide movement therebetween. The plates 36 are notched at their upper corners so that the top edge 38 may lie along and be welded to the web of the cross-sills 32.

The foregoing construction provides great strength and ridigity to the vehicle frame and accordingly, the channel members 10, 11 and the Z-section members 12 and 14 may be formed of relatively light guage metal. As an example, the sections 10, 11, 12 and 14 may be made of metal approximately ⅛" thick and thus these sections may be easily formed by a rolling operation. Further, as an example, the vertical web 31 of the sections 10, 11 may be 10" high and the upper legs 34 and lower legs 34a may be 3" wide. The legs and web of the members 12, 14 may be of proportionate sizes.

The upper surface of the legs 16 of the members 12, 14 are preferably formed with wear strips 39, these strips slidably engaging the lower surfaces of the cross-sills 32. Thus, the weight of the rear portion of the channel members 10, 11, the adjoining cross-sills 32, and the load imposed thereon is carried by the Z-section members 12, 14 and in turn is supported by the wheel unit.

To prevent undue vertical separation of the members 10, 11 and 12, 14 at the wear strips 39, hold-down fingers 40 underlie the upper legs 16 of the Z-section members 12, 14 and are carried by the lower legs of the cross-sills 32. Thus, channel members 10, 11 and cross-sills 32 may slide longitudinally over the members 12, 14. To hold against such sliding movement, a plurality of bolts 41 are passed through adjoining webs 15, 31. Preferably a sleeve 42 is disposed around the bolt and has opposite ends bearing against the inner surface of the web 31 and the facing surface of the angular extension 37 of a plate 36 to prevent buckling of the web 31 when the nuts on the bolts are drawn up tightly, and thus to impart additional rigidity.

As seen in FIGURE 2, a series of apertures 43 may be formed in the vertical web 15 of the members 12, 14 so that the wheel bogey may have a slider arrangement. For example, if it is desired to adjust the wheel bogey longitudinally of the channel members 10, 11, the nuts on the bolts 41 are removed and the bolts are withdrawn. Then with the wheel brakes (not shown) on the bogey unlocked, a tractor (not shown) which is connected to the front of the frame, may push or pull (as desired) to move the channel members longitudinally to alignment with a different set of apertures, whereupon the bolts 41 are replaced and the nuts engaged.

Instead of the bolts 41, the bogey frame and the channel members 10, 11 may be locked against movement by mechanism disclosed in my co-pending patent application filed August 2, 1962, Serial No. 214,703, and entitled Vehicles. Thus, an elongated rack 45 (shown in dotted lines in FIGURE 1) may be secured across the end channels 29 and cooperate with latching mechanism as disclosed in said patent application. To impart further rigidity to the frame, wear strips 39a may be disposed between adjoining legs 34a, 17 of the members 10, 11 and 12, 14.

To complete the trailer bed construction, lower rub rails 46, 46 of modified channel construction may be welded across opposite ends of the cross-sills 32. In the event a van body is desired, upright members 47 may be welded to the rub rails 46 at selected places longitudinally along the latter, the upper ends of the upright members 47 being welded to upper rub rails 48 which are also of modified channel construction. A sheet metal covering or skin 49 is then secured across the upright members 47 to complete the outer side covering of the van. Plywood panelling 50 may be secured to the inner side of the upright members 47 to complete the inner side covering of the van. A floor lip 51, in the form of an elongated angle iron, may be welded across the respective ends of the cross-sills 32 and to the upright members 47, and the flooring and the plywood panelling formed with mortise recesses to receive the opposite legs of the floor lip. In this way entrance of water to the interior of the van at the lower sides of the bed is restricted.

The upper rub rail provides a longitudinal recess in which the running lights 52 may be disposed for protection against breakage. Roof bows 53, in the form of channel pieces, may be welded between the upper rub rails 48, as seen in FIGURE 1. A roof skin 54, in the form of a metal sheet or series of sheets, may then be secured across the roof bows 53 to complete the top of the van. Panel clips 55 may be welded to opposite ends of the roof bows to hold the upper ends of the plywood panelling 50 in place.

In view of the foregoing it will be apparent to those skilled in the art that I have accomplished at least the principal object of my invention and it will also be apparent to those skilled in the art that the embodiment herein described may be variously changed and modified, without departing from the spirit of the invention, and the invention is capable of uses and has advantages not herein specifically described; hence it will be appreciated that the herein disclosed embodiments is illustrative only, and that my invention is not limited thereto.

I claim:

1. A frame for a vehicle, comprising a wheel unit underneath said vehicle frame, a pair of channel members spaced-apart laterally and extending lengthwise of said vehicle, a plurality of cross-sills extending cross-wise of said channel members, the latter having openings in their vertically extending webs for closely receiving said cross-sills and the latter being welded to said channel members to form a rigid construction, a pair of Z-section structural members also spaced-apart laterally and extending lengthwise of said vehicle, each Z section member adjoining a respective channel member and having vertically extending webs generally parallel to and spaced inwardly of the webs of respective channel members, the upper leg of said Z-section member underlying and slidably supporting said cross-sills to support the same and said channel members and the load imposed thereon whereby said cross-sills and said channel members and said Z-section members may be relatively adjusted in a direction longitudinally of said vehicle, said wheel unit being connected to said Z-section member and supporting the same from a road surface.

2. The construction according to claim 1 wherein bolt means extend through said adjoining webs to hold the same connected and to restrict relative adjustment of said channel members and said Z-section members.

References Cited by the Examiner

UNITED STATES PATENTS

| | | | |
|---|---|---|---|
| 2,606,769 | 8/52 | DeLay | 280—80 |
| 2,812,192 | 11/57 | Cole | 280—106 |
| 2,831,735 | 4/58 | Bennett | 280—80 |
| 2,993,728 | 7/61 | Beran | 280—80 |
| 3,101,819 | 8/63 | Shinn | 280—106 X |

A. HARRY LEVY, *Primary Examiner.*

PHILIP ARNOLD, *Examiner.*